Nov. 7, 1939.    H. DIAMOND    2,179,284
HIGH SPEED WELDING
Filed June 16, 1938    3 Sheets-Sheet 1

WITNESSES:
Edward Michaels
Leon J. Jaza

INVENTOR
Hymen Diamond.
BY
F. W. Lyle.
ATTORNEY

Nov. 7, 1939.  H. DIAMOND  2,179,284
HIGH SPEED WELDING
Filed June 16, 1938  3 Sheets-Sheet 3

WITNESSES:
Edward Michaels
Leon J. Jaza

INVENTOR
Hymen Diamond.
BY F. W. Lyle,
ATTORNEY

Patented Nov. 7, 1939

2,179,284

UNITED STATES PATENT OFFICE 2,179,284

HIGH SPEED WELDING

Hymen Diamond, Pittsburgh, Pa., assignor to Westinghouse Electric & Manufacturing Company, East Pittsburgh, Pa., a corporation of Pennsylvania Application June 16, 1938, Serial No. 214,027

12 Claims. (Cl. 219—4)

My invention relates, generally, to electric welding and it has particular relation to resistance welding.

To control the current flow in resistance welding systems using alternating current of a commercial frequency, various types of controls have been proposed. These have included timing circuits for controlling the flow of current impulses through the work piece at a rate determined by the frequency of the source of electric energy. The spacing between the welds formed by these current impulses is determined by the speed of the work piece relative to the welding electrodes and the rate at which the welding pulses are supplied. In accordance with the teaching of the prior art, of which I am aware, the highest rate of supply of impulses has been the rate, corresponding to the supply of one impulse during each half cycle of the source. For an ordinary commercial device, that is, therefore, 120 welds per second or 7200 welds per minute. In the canning industry, approximately 300 cans pass through the apparatus per minute. The cans may be assumed to have a periphery 5 inches in length. Accordingly, 1500 inches would in a canning system pass through the welding apparatus per minute. A welding arrangement connected and operated in accordance with the teachings of the prior art would, therefore, induce between 4 and 5 welds per inch. Since the cans are to be hermetically sealed, this is insufficient. The permissible minimum is 10 to 12 welds per inch and this is unattainable with prior art apparatus, particularly where it is to be supplied from a commercial source as is commonly the case.

It is accordingly, an object of my invention to provide a welding arrangement for supplying welding impulses from a commercial source at a rate greater than twice the frequency of the source.

Another object of my invention is to provide for supplying a plurality of symmetrical dephased current impulses for producing individual welds for each succeeding half cycle of alternating current.

A broad object of my invention is to provide for controlling the flow of current in a resistance welding system.

A more specific object of my invention is to provide high speed welding apparatus, particularly adapted to be used for closing cans in the canning industry.

According to my invention, I propose to supply the welding current through a plurality of channels. The channels are provided with phase shifting elements which displace the current supplied through each channel in phase with reference to that supplied through the others by an angle less than 180 electrical degrees. Each of the successive impulses supplied through the channels is impressed on the material as a separate welding impulse. Preferably, but not necessarily, the welding impulses thus provided should be of peaked wave form so that the welds are completely discrete.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
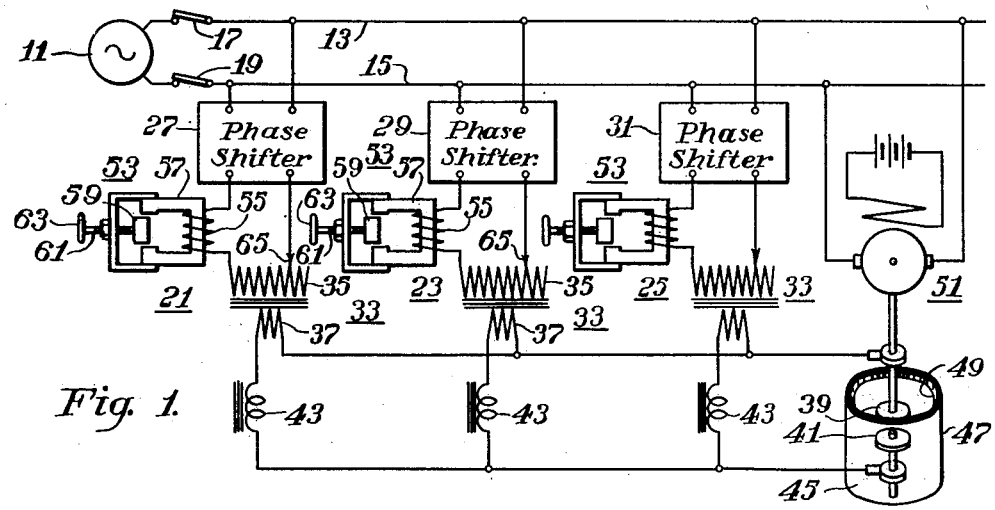
Figure 1 is a diagrammatic view of a welding system organized in accordance with the present invention.

The apparatus shown in Fig. 1 comprises a generator 11 or any other source of electrical energy, which may be adapted to supply alternating currents of commercial frequency, such as 60-cycles, to a pair of conductors or bus bars 13 and 15. Switches 17 and 19 may be utilized to disconnect the generator 11 from the conductors 13 and 15. A plurality of welding supply units 21, 23 and 25 are connected in parallel across the conductors 13 and 15 through a plurality of phase shifters 27, 29 and 31, respectively.

Each welding unit comprises a transformer 33 having a primary winding 35 and a secondary winding 37. The secondary windings 37 are connected in parallel to a pair of welding electrodes 39 and 41. A reactor 43 may be connected in series with each of the secondary windings 37 if the impedance of the transformers is of the order of the impedance of the welding circuit. The reactor 43, which may be one of the several types well known in the art, is saturable at low currents and has a low impedance at high currents. A reactor of this type may have a completely closed core, a portion of which has a reduced cross sectional area.

The material to be welded such as a can 45 comprises a main body member 47 and a lid 49. The lid 49 may be arranged to interfit with the main body member 47 to provide a rim which may be positioned between the pair of roller welding electrodes 39 and 41 for performing the welding operation.

In order to move the can 45 relative to the electrodes 39 and 41, a synchronous motor, shown generally at 51, is provided and as illustrated, it is connected to drive the electrode 39. The motor may be electrically connected to the conductors 13 and 15 to thus be energized from the generator 11. It will be understood, however, that it is not necessary to use a synchronous motor, but that any suitable driving means may be provided which will move the can 45 at a fixed speed relative to the electrodes 39 and 41 so that the proper spacing of the individual welds may be obtained.

To control the flow of current so that individual welds may be obtained, each of the welding units 27, 29 and 31 may also comprise a saturable reactor 53, having a winding 55 connected in series circuit relation with the primary winding 35 of transformer 33. The winding 55 is wound on an iron core 57, the saturation of which may be varied by means of a movable portion 59 of the iron core carried by a screw 61 which may be adjusted by a hand wheel 63. To compensate for change in impedance of the system caused by change in position of the portion 59, and thus to maintain the same predetermined peak value of current, a tap 65 on primary winding 35 may be adjusted as will be readily understood.

The number of welding units 21, 23 and 25 is determined by the speed at which the material 45 is moved and the spacing required between the welds. The settings of the phase shifters are selected in such manner that a series of peaked current impulses are successively transmitted through the electrodes 39 and 41 and the material 45 when the system is supplied with electrical energy. Thus, for example, if the welding is to take place at the rate of 360 welds per second three welding units as shown in Fig. 1 need be utilized when generator 11 supplies alternating current at a frequency of 60 cycles per second. In such a case, the phase shifters are selected, or when adjustable are pre-set, so that the welding impulses are displaced by 120°.

Figure 4:
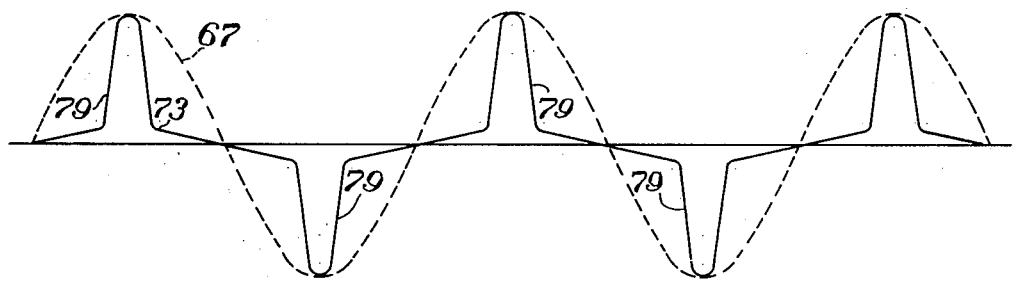
Figs. 4 and 5 are a group of curves illustrating graphically certain characteristics of a welding system operated in accordance with my invention.
Figure 4:
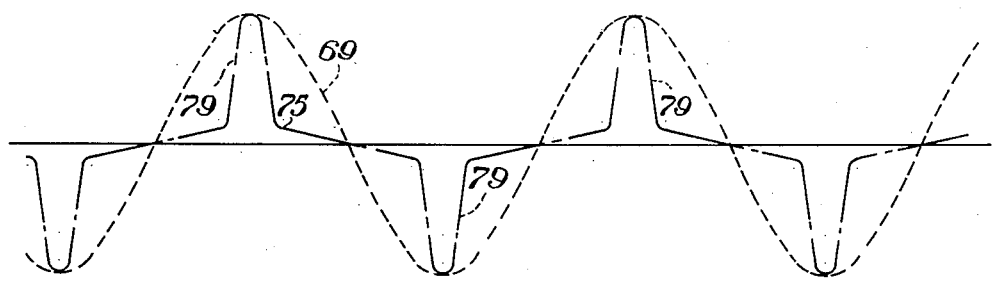
Figure 4:
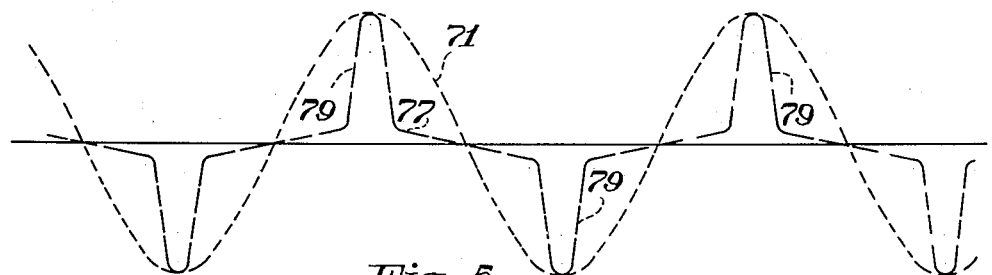
Figure 5:
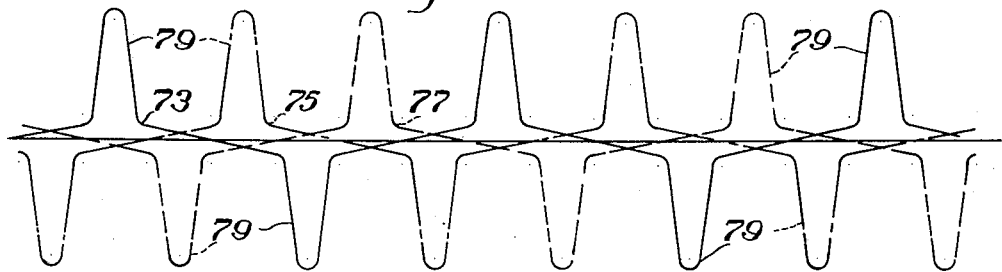

In Figs. 4 and 5, curves are plotted with current and potential values as ordinates and time intervals as abscissae. In Fig. 4, dotted curves 67, 69 and 71 represent the potentials supplied to the welding units 21, 23 and 25, respectively. The potential 67 may be in phase with the potential of the generator 11. The potential 69 lags the potential 67 by 120°, and the potential 71 lags the potential 67 by 240°. The currents from the transformer secondaries 37 of the welding units 21, 23 and 25 are represented by curves 73, 75 and 77, respectively.

The curves 73, 75 and 77 are grouped together in Fig. 5 to more clearly illustrate the spacing between the successive welding impulses represented by the peaked portions 79 of the curves. Thus when these welding units are utilized a welding impulse is provided at substantially each 60° phase interval of the potential supplied by the generator 11. It is to be noted that in Fig. 5, the welding current rather than the energy supplied to the welds is plotted as a function of time and for this reason the alternate peaks are shown to be of opposite polarity. Of course, the same energy is supplied to the material to be welded, whatever the polarity of the current. A plot of the energy supplied as a function of time would show all the peaks of Fig. 5 above the axis.

Current values sufficient to effect the welding operation are represented by the peaked portions 79 of the current curves 73, 75 and 77. When the saturable reactor 53 is provided, the current from each welding unit is maintained at a value less than that required for performing the welding operation for a predetermined time. At the end of this time interval, the saturating characteristics of the reactor 53 become effective and current represented by the peak portion 79 flows for another predetermined interval, and then the current is again reduced to a value below that required for performing the welding operation for the remaining time interval of the half cycle, when the foregoing current cycle is repeated.

Figure 2:
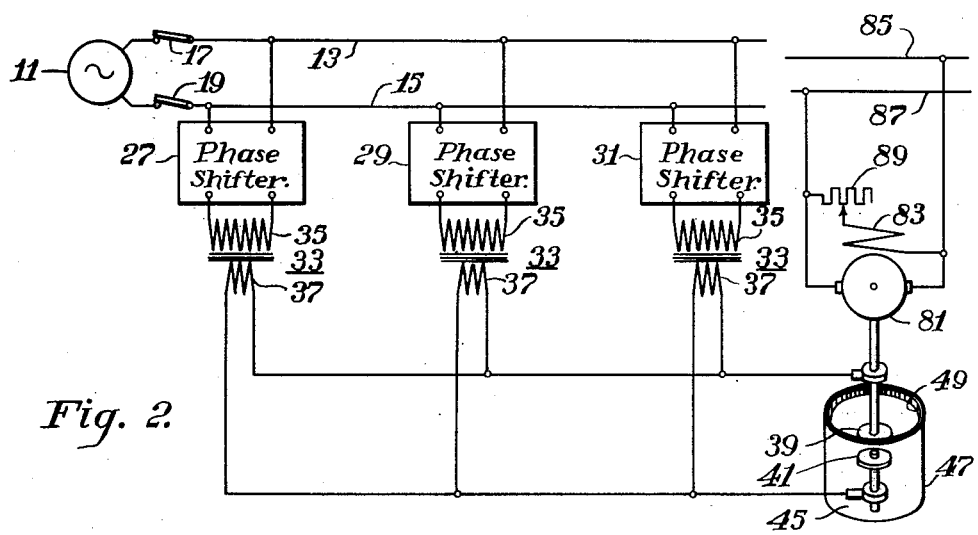
Fig. 2 is a diagrammatic view of a modification of my invention.

The welding system shown in Fig. 2 is similar to that shown in Fig. 1 except that the saturable reactors 53 have been omitted from the welding units 21, 23 and 25. In this case the transformers 33, which may be of the saturable type have an impedance which is substantial compared to the impedance of the welded material. A motor 81 having a field winding 83 which may be energized from any suitable source of electrical energy such as bus bars 85 and 87 is utilized to drive the can 45 at a speed adjusted to a predetermined value by means of a rheostat 89.

Figure 3:
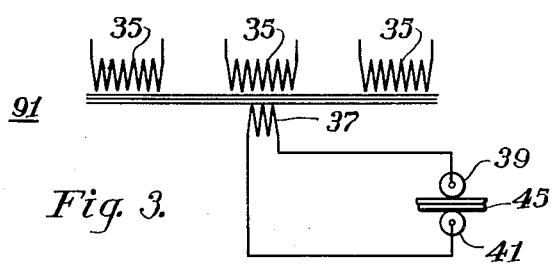
Fig. 3 is a partial view illustrating an alternative arrangement of the welding transformer windings.

A single transformer 91 having a plurality of primary windings 35 and a single secondary winding 37 as shown in Fig. 3 may be utilized in place of the individual transformers 33.

Figure 6:
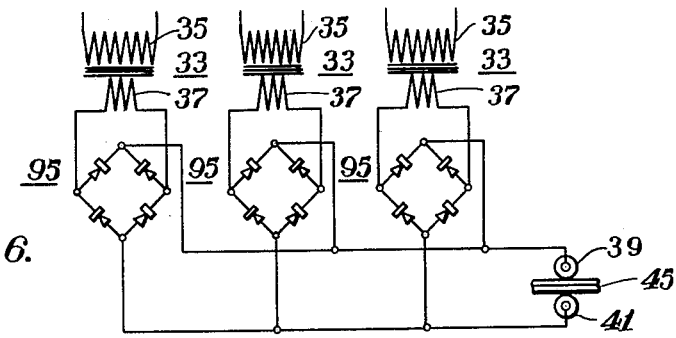
Fig. 6 is a partial diagrammatic view of a modification of my invention utilizing rectifiers.

In Fig. 6 full-wave rectifiers 95 are connected across the secondary windings 37 of the transformers 33 to prevent the flow of circulating currents between the various secondary windings. The rectifiers 95 may be of the copper copper-oxide disc-type such as are described in the copending application for Welding system, Serial No. 224,709, filed August 13, 1938 to John W. Dawson and assigned to the Westinghouse Electric & Manufacturing Company. Rectifiers of this type are now available which transmit the heavy currents required for resistance welding.

Figure 7:
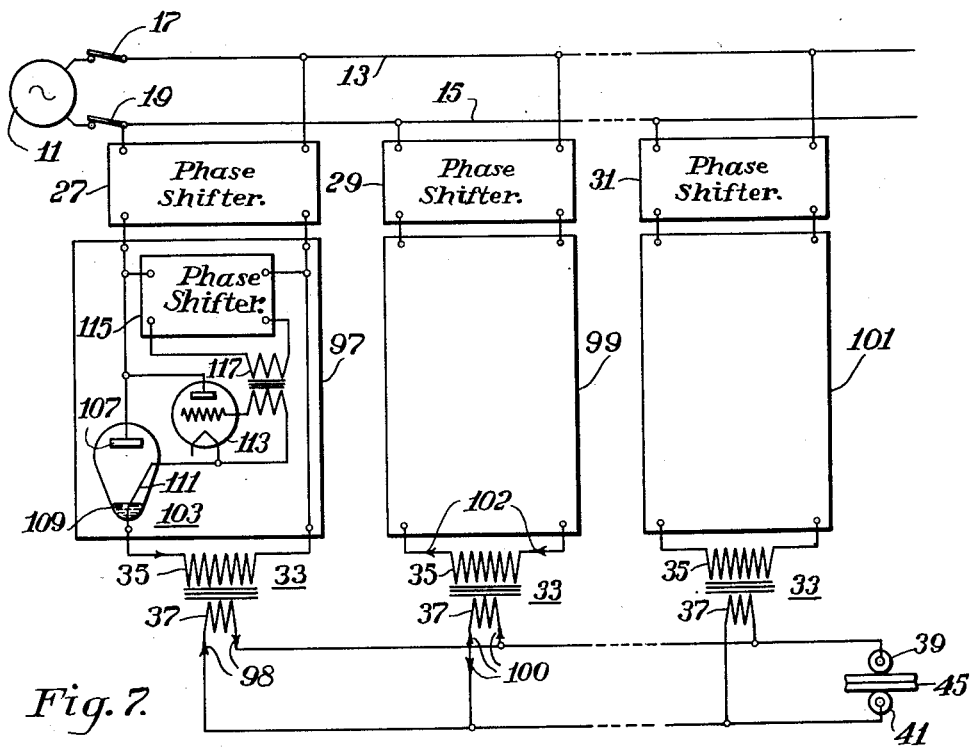
Fig. 7 is a modification of my invention utilizing electric discharge devices.

In Fig. 7, a plurality of welding supply units 97, 99 and 101 are energized from generator 11 through the phase shifters 27, 29 and 31. Each welding unit comprises an electric discharge device 103 connected in series circuit relation with the primary winding 35 of transformer 33. While an electric discharge device of the immersed-ignition-electrode type having an anode 107, a mercury pool cathode 109 and igniter 111 is shown, other discharge devices of the arc discharge type or even of the high vacuum type may be utilized. A second electric discharge device 113 is connected between the anode 107 and igniter 111 of the discharge device 103. A phase shifter 115 and a transformer 117, preferably, but not necessarily of the saturable type, are utilized to supply a control potential for the discharge device 113. The control of the welding units 97, 99 and 101 is such that the discharge devices 103 become conductive late in each positive half cycle of the potential applied to the anodes 107 to supply spaced current impulses to the material 45 through the electrodes 39 and 41. When the secondary winding 37 associated with welding unit 99 supplies welding current to the electrodes 39 and 41 it is not short circuited by the secondary windings 37 associated with the remaining welding units 97 and 101. The short-circuiting does not occur because current flow through the non-excited secondaries 37 is blocked by the rectifiers 103 in the primary circuits. Assume, for example, that the current in the secondaries 37 when the corresponding primary 35 is energized, is in the same direction as in the primary. In such a case the extreme left hand secondary 37 when energized impresses a potential tending to produce current flow in the direction of the arrows 98. If current flowed through the center secondary 37 under the potential impressed in the left hand secondary it would have the polarity of the arrows 100. The corresponding current flow in the primary would then be in the direction of the arrows 102 and this is contrary to the current passing direction of the rectifier 103 in the system 99.

Figure 8:
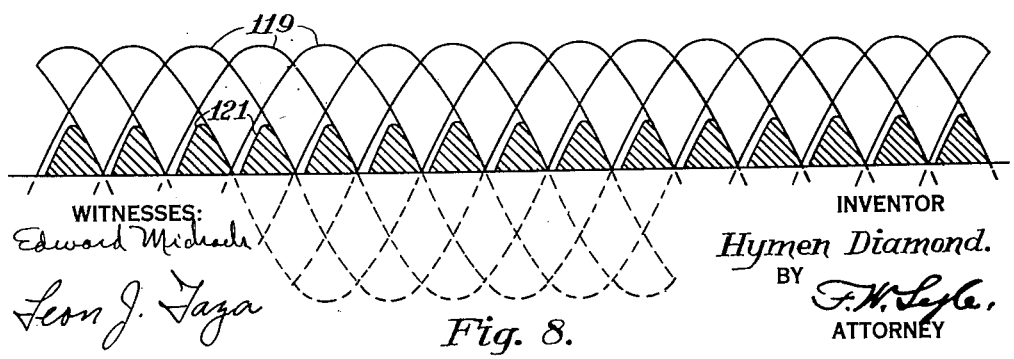
Fig. 8 is a group of curves illustrating the operation of a plurality of welding units described with reference to Fig. 7.

In Fig. 8, the curves 119 represent the dephased potentials supplied to a welding system utilizing six welding units described with reference to Fig. 7. The shaded areas beneath curves 121 represent the welding impulses.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. The method of resistance welding with a source of alternating current which comprises passing a plurality of current impulses dephased with respect to each other through the work to be welded during each half cycle of alternating current, and moving the work at a speed to effect individual welds at spaced points along the joint being welded.

2. The method of fastening together thin elements by resistance welding with apparatus including an alternating current source of at least commercial frequency and welding electrodes coupled to said source which comprises the steps of moving said elements relative to said electrodes and in contact therewith and passing a plurality of impulses of current, from said source through said elements during each half-period of said source.

3. The method of resistance welding which comprises passing a plurality of current impulses dephased with respect to each other through the work to be welded during each half cycle of alternating current, each current impulse having a value less than that required for welding for a predetermined interval in the first portion of a half cycle of alternating current, then increasing to a value sufficient to perform the welding operation for a predetermined interval in the next portion of the half cycle, finally reducing the current to the former value for a predetermined interval in the last portion of the said half cycle of alternating current, and moving the work at a speed to effect individual welds at spaced points along the joint being welded.

4. Apparatus for seam welding material at a high speed from a source of alternating current of commercial frequency comprising a single circuit through which power is supplied to weld said material, a plurality of supply channels interposed between said source and said circuit and means for adjusting the phase of the current supplied through each said channel relative to the waves of said source to a value such that half waves of current are supplied in sequence from said channels at intervals less than a half cycle of said source.

5. Apparatus according to claim 5 characterized by the fact that each channel includes means for converting the half waves supplied to it from the source into impulses having a substantial value during an interval of time that is short compared to a half period of said source so that a number of discrete impulses are supplied to said circuit during any half period of said source.

6. Apparatus for welding, comprising a source of alternating current, a pair of electrodes between which the work to be welded is placed, a plurality of supply channels interposed between said source and said electrodes and means for adjusting the phase of the current supplied through each said channel relative to the waves of said source to a value such that half waves of current are supplied in sequence from said channels at intervals less than a half cycle of said source.

7. Apparatus for seam welding cans at a high speed from a source of alternating curent of commercial frequency, a pair of electrodes through which power is supplied to weld said cans, a plurality of supply channels interposed between said source and said electrodes, means for adjusting the phase of the current supplied through each said channel relative to the waves of said source to a value such that half waves of current are supplied in sequence from said channels at intervals less than a half cycle of said source and means for moving said cans relative to said electrodes.

8. Apparatus for seam welding material at a high speed from a source of alternating current of commercial frequency having a plurality of primary windings and a secondary winding, a single circuit connected to the said secondary winding through which power is supplied to weld said material, a plurality of supply channels interposed between said source and said primary windings, and means for adjusting the phase of the current supplied through said channels relative to the waves of said source to a value such that half waves of current are supplied in sequence at intervals less than a half cycle of said source.

9. Apparatus for seam welding material at a high speed from a source of alternating current of commercial frequency, comprising a single circuit through which power is supplied to weld said material, a plurality of supply channels interposed between said source and said circuit, each said channel including a reactor, and a transformer having a secondary winding connected in series with said reactor, and means for adjusting the phase of the current supplied through each said channel relative to the waves of said source to a value such that half waves of current are supplied in sequence from said channels at intervals less than a half cycle of said source.

10. Apparatus for seam welding material at a high speed from a source of alternating current of commercial frequency, comprising a pair of electrodes between which the work to be welded is placed, a plurality of supply channels interposed between said source and said electrodes, each channel including a rectifier for controlling the flow of current through the channel, means for adjusting the phase of the current supplied through each said channel relative to the waves of said source to a value such that half waves of current are supplied in sequence from said channels at intervals less than a half cycle of said source.

11. Apparatus for welding material at a high speed from a source of alternating current of commercial frequency, comprising a single circuit through which power is supplied to weld said material, a plurality of supply channels interposed between said source and said circuit, means for adjusting the phase of the current supplied through each said channel relative to that supplied through the other channels by an angle less than 180 electrical degrees, and means for converting the half waves supplied to each channel into impulses having a substantial value during an interval of time that is short compared to a half period of said source so that a number of discrete impulses are supplied to said circuit during any half period of said source.

12. Apparatus for seam welding a material at a high speed from a source of alternating current of commercial frequency, comprising a single circuit through which power is supplied to weld said material, a plurality of supply units interposed between said source and said circuit, each said supply unit comprising an asymmetric electric discharge device, means for rendering said device conducting during a predetermined portion of each cycle of said source, and means associated with each unit for adjusting the phase of the current supplied through each unit relative to that supplied through the other units so that a number of discrete current impulses are supplied to said circuit during each half cycle of said source.

HYMEN DIAMOND.